US010242163B2

(12) United States Patent
Biswas et al.

(10) Patent No.: US 10,242,163 B2
(45) Date of Patent: Mar. 26, 2019

(54) ACCESS TO PROTECTED CONTENT BASED ON LICENSE HIERARCHY

(75) Inventors: Sanjeev Kumar Biswas, New Delhi (IN); Pradeep Cyril Ekka, New Delhi (IN); Suraj Ranjan, Noida (IN); Vikas Kamate, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 1825 days.

(21) Appl. No.: 12/273,925

(22) Filed: Nov. 19, 2008

(65) Prior Publication Data

US 2013/0198734 A1 Aug. 1, 2013

(51) Int. Cl.
*G06Q 30/00* (2012.01)
*G06F 21/10* (2013.01)

(52) U.S. Cl.
CPC .... *G06F 21/105* (2013.01); *G06F 2221/2113* (2013.01)

(58) Field of Classification Search
CPC ................................ G06F 21/10; G06Q 30/06
See application file for complete search history.

(56) References Cited

U.S. PATENT DOCUMENTS

| | | | | |
|---|---|---|---|---|
| 5,629,980 A * | 5/1997 | Stefik et al. | ..................... | 705/54 |
| 6,810,389 B1 * | 10/2004 | Meyer | ............................. | 705/59 |
| 7,568,096 B2 * | 7/2009 | Evans et al. | .................. | 713/157 |
| 7,743,378 B1 * | 6/2010 | Markov | ............... | G06F 9/5044 |
| | | | | 718/101 |
| 2003/0159033 A1 * | 8/2003 | Ishiguro | .................. | G06F 21/10 |
| | | | | 713/156 |
| 2005/0228809 A1 * | 10/2005 | Asano et al. | ................. | 707/100 |
| 2005/0251487 A1 * | 11/2005 | Evans et al. | .................... | 705/59 |
| 2006/0075505 A1 * | 4/2006 | Murthy et al. | .................. | 726/26 |
| 2006/0190404 A1 * | 8/2006 | Stefik | ..................... | G06F 21/10 |
| | | | | 705/51 |

(Continued)

FOREIGN PATENT DOCUMENTS

EP 1278330 A1 * 1/2003 ....... G11B 20/00086

OTHER PUBLICATIONS

Roy et al. Learning annotated hierarchies from relational data. (2007). Retreived online Oct. 29, 2018. http://danroy.org/papers/RoyKemManTen-NIPS-2007.pdf (Year: 2007).*

*Primary Examiner* — James A Reagan
(74) *Attorney, Agent, or Firm* — Kilpatrick Townsend & Stockton LLP

(57) ABSTRACT

According to example configurations as described herein, use of software can be contingent upon whether a hierarchical license tree has a valid license for a software resource associated with a respective node in the tree. For example, an installer can be configured to traverse the hierarchical license tree to identify which, if any, of the software resources as represented by nodes in the tree has a valid license and therefore can be installed for execution on a respective computer system. If a valid license exists for a given node in the tree, the software resource associated with the given node as well as software resources associated with child nodes of the given node can be installed for use on the computer. A software resource manager can be configured to prevent installation, execution, etc., of software resources for nodes above the respective parent node that do not have a corresponding valid license.

26 Claims, 10 Drawing Sheets

(56) References Cited

U.S. PATENT DOCUMENTS

2007/0025694 A1* 2/2007 Takashima et al. ............ 386/95
2008/0027870 A1* 1/2008 Nam et al. ..................... 705/59
2008/0063200 A1* 3/2008 Takashima et al. .......... 380/201

* cited by examiner

ACCESS TO PROTECTED CONTENT BASED ON LICENSE HIERARCHY

BACKGROUND

As well known, software vendors create software for use by consumers to carry out many different tasks. In many circumstances, vendors require that a user or other entity pay a fee to use respective its software and/or software features.

Software vendors typically grant licenses to use copies of software, but actual ownership of the software remains with the software vendor. As mentioned, an end-user sometimes must purchase a license in order to use respective software.

As an example, a consumer can purchase a physical disk on which software is stored. The purchased software can include a sticker or label printed on the outside of the software, but inside the package. The label includes a license code. The license code often includes a unique code of symbols such as numbers, digits, text, hyphens, etc.

Typically, when the purchased software is being installed or used for the first time on a computer system, the user is prompted to type in the license code on the label. This code is then decoded by the software back to its base serial number.

When inputting the code, if the user mistypes a single character in what is sometimes a very long code, the software will prevent installation or use of the software until the user types in the correct code printed on the label. When a code is entered correctly, a respective user is then enabled to install and subsequently execute the software.

Conventional methods have evolved to prevent multiple parties from downloading and using the same set of purchased software. For example, the expansion of computer networking affords additional levels of software protection such as network registration and online registration.

In general, software that employs conventional network registration as an added security level keeps a copy of the actual serial number being used in the license code. When active, the number of the serial number is broadcasted on a channel of the local network. If the software has been installed on another computer on that same network, using the same license code, when the second copy will detect that the serial number is in use on the network and typically will refuse to run. This prevents a small business from buying one copy of expensive software and installing it on several of the computers at their location, provided they are networked.

The conventional technique of on-line registration is similar to use of the activation codes as discussed above, but adds another level of security. For example, most computers are connected to the internet. The connection allows the software manufacturers to add an additional check to their system during the installation process. When the user enters a valid license code, the software is not immediately installed on the user's machine. Instead, an installer program associated with the software uses an internet connection of the computer to contact the software vendor's a server. The installer transmits the license code to the server, and then waits for the server for a communication indicating whether the installer can install the software application. The vendor's server maintains a database of all the serial numbers that have been used to install their software. If a single serial number is used on a number of machines (such as a typical limit of several different computers) then the server tells the software that it may be a copy and to abort the installation. The user is usually presented with a dialog instructing them to contact the manufacturer to discuss the reason for the installation failure.

Conventional techniques for managing use of licenses suffer from a number of deficiencies. For example, conventional techniques enable a respective entity to purchase and obtain a license in order to use software as discussed above. However, software has become quite complex. In many circumstances, obtaining a license for a first vendor software may enable use of software from one or more other vendors. That is, downloading of software from a first vendor can include downloading and/or enabling use of protected content such as plug-ins provided by third-party vendors. Thus, providing the license to use the first vendor's software may enable an entity to use not only the software developed by the first vendor but other vendor software as well. It is quite possible that the entity obtaining the software license as discussed above may subsequently purchase additional software from the first software vendor or other software vendor. The subsequently purchased software may include software that at least partially overlaps with respect to the original software. That is, newly downloaded software may use portions of the same protected software as previously downloaded software. However, conventional installer models do not take into account or may not be aware of the overlap.

BRIEF DESCRIPTION

Accordingly, conventional installers require different independent access codes to independently download the groupings of software without regard to whether any software has already been downloaded or whether there is an overlap of access or installation rights.

Embodiments herein deviate with respect to conventional applications. For example, embodiments herein are directed to unique ways of enabling access to software functionality and related protected content.

More specifically, embodiments herein include a software resource manager configured to produce and/or maintain a hierarchical license tree to include multiple nodes. Each node in the hierarchical license tree can represent a respective software resource. The software resource manager maintains or stores license information associated with each of the multiple nodes in the hierarchical license tree. The license information specifies which software resources in the hierarchical license tree have been licensed for use. Accordingly, the hierarchical license tree can specify which of multiple software resources can be downloaded and/or executed on a corresponding computer.

Installation of software can be contingent upon whether the hierarchical license tree stores a valid license for a software resource associated with a respective node in the tree. For example, an installer can be configured to traverse the hierarchical license tree to identify which, if any, of the software resources as represented by nodes in the tree has a valid license and therefore can be installed for execution on a respective computer system. Installation of a software resource thus can be contingent upon whether a valid license exists for a corresponding node in the tree.

In one embodiment, if a valid license exists for a given node in the tree, the software resource associated with the given node as well as software resources associated with child nodes beneath the given node can be installed on the computer system.

Accordingly, embodiments herein include a software resource manager configured to enable installation, execution, use, etc., of software resources for nodes beneath the respective parent node based on detecting that a valid software license exists for a parent node of the hierarchical license tree. The software resource manager can be configured to prevent installation, execution, use, etc., of software resources for nodes above the respective parent node that do not have a corresponding valid license.

In one embodiment, the hierarchical license tree includes at least one parent node and multiple child nodes beneath the parent node. For illustrative purposes, assume that the parent node in the hierarchical license tree has an associated valid license and that none of the child nodes has a corresponding valid license. In such an instance, the entity is able to perform operations such as execution and/or installation of any software resources beneath the parent node such as a software resource associated with the first child node and a software resource associated with the second child node merely because the child nodes reside at a lower level in the tree beneath the parent node.

As another example, assume that a parent node and corresponding first child node in the hierarchical license tree do not have associated valid licenses and that only a second child node under the parent node has a corresponding valid license in the hierarchical license tree. In such an instance, the entity is able to perform operations such as execution and/or installation of the software resource associated with the second child node and any software resources associated with any nodes beneath the second child node. In this latter case, the entity is prevented from performing operations such as execution and/or installation of a software resource associated with the parent node and a software resource associated with the first child node.

As will be discussed later in this specification, an entity can have a valid license to use a particular resource such as a software application produced by a first vendor. A parent node in the hierarchical license tree can represent the software application by the first vendor. Operation of the software application may require additional software resources such as one or more plug-ins produced by a second vendor, third vendor, etc. Child nodes in the hierarchical license tree beneath the parent node can represent the plug-ins or other protected content associated with, for example, third-party vendors. As mentioned above, presence of a valid license for the software application at the parent level entitles access to resources represented by the child nodes even though the hierarchical license tree may not have an associated valid license for any of the child nodes beneath the parent node.

As previously discussed, distribution of a vendor's software can include distribution of third party software as well. In accordance with the above discussion, the hierarchical license tree can be populated to indicate which branches of software resources beneath a parent node can be installed on a computer system.

The hierarchical license tree as described herein can be used in a number of different environments. For example, the hierarchical license tree can be used locally by a software resource manager such as an installer that selectively downloads software resources such as applications, protected content, etc., onto a remote or local computer system. In such an embodiment, the installer can analyze the hierarchical license tree to identify valid licenses associated with the computer system and initiate installation of the appropriate software resources onto the computer system.

In further embodiments, the hierarchical license tree can be used in SaaS (Software as a Service) environments in which clients receive software services over a network from a server. In such embodiments, the server can initiate distribution of a shell application to a client. Upon execution of the shell application at the client, a software resource manager utilizes the hierarchical license tree to identify what different software resources or software services the client is authorized to use. The software resource manager thereafter initiates execution of authorized software resources at a host computer that, in turn, provides the software services to the client executing the shell application. The can reside at a remote location with respect to the client computer requesting the use of services.

These and other embodiments will be discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer readable medium having instructions stored thereon for supporting operations such as managing software resources. The instructions, when carried out by a processor of a respective computer device, cause the processor to: produce a hierarchical license tree to include multiple nodes; associate each of the multiple nodes in the hierarchical tree with a software resource; and store license information associated with the multiple nodes in the hierarchical license tree to specify which software resources in the hierarchical license tree have been licensed for use. The ordering of the steps has been added for clarity sake, these steps need not be performed in any particular order.

Another embodiment of the present disclosure is directed to a computer program product that includes a computer readable medium having instructions stored thereon for supporting operations such as providing software services. The instructions, when carried out by a processor of a respective computer device, cause the processor to: provide a client computer access to a software manager over a network; in response to receiving a message from the client computer, traverse a hierarchical license tree associated with the client computer to identify a parent node of the hierarchical license tree having a valid software license; and enable use of a group of software resources by the client computer, the group of software resources including the software resource associated with the parent node and software resources associated with child nodes beneath the parent node. The ordering of the steps has been added for clarity sake, these steps need not be performed in any particular order.

Other embodiments of the present disclosure include software programs to perform any of the method embodiment steps and operations summarized above and disclosed in detail below.

Embodiments herein also include a computer-implemented method comprising: executing instructions on a computing platform to produce, via generation of binary digital electronic signals, a hierarchical license tree, the hierarchical license tree including multiple nodes, each of the multiple nodes in the hierarchical license tree representing a software resource; storing the hierarchical license tree in a memory location of the computing platform for later use; executing instructions on the computing platform to receive license information associated with at least one of the software resources in the hierarchical license tree, the license information specifying which of the software resources in the hierarchical license tree have been licensed for use; and executing instructions on the computing platform to store the valid license for a software resource at a parent node in the hierarchical license tree to indicate that the software resource at the parent node and software resources associated with nodes beneath the parent node are licensed for use.

Embodiments herein also include a computer-implemented method comprising: executing instructions on a computing platform to store, via generation of binary digital electronic signals, a hierarchical license tree in a memory location of the computing platform for later use; executing instructions on a computing platform to provide a client computer access to a software manager over a network; executing instructions on the computing platform to traverse the hierarchical license tree associated with the client computer to identify a parent node of the hierarchical license tree having a valid software license in response to receiving a message from the client computer; and executing instructions on the computing platform to enable use of a group of software resources by the client computer, the group of software resources including the software resource associated with the parent node and software resources associated with child nodes beneath the parent node.

Also, it is to be understood that the system, method, apparatus, etc., as discussed herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems Incorporated of San Jose, Calif., USA.

As discussed above, techniques herein are well suited for use in software applications licensed to one or more user. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions as described herein can be embodied and viewed in many different ways.

Also, note that this summary section herein does not specify every embodiment and/or incrementally novel aspect of the present disclosure or claimed invention(s). Instead, this summary only provides a preliminary discussion of different embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to example embodiments herein, use of software can be contingent upon whether a hierarchical license tree has a valid license for a software resource associated with a respective node in the tree. For example, an installer can be configured to traverse the hierarchical license tree to identify which, if any, of the software resources as represented by nodes in the tree has a valid license and therefore can be installed for execution on a respective client computer system or a host computer system that executes the licensed software and provides corresponding software services to the client computer system. If a valid license exists for a given node in the tree, the software resource associated with the given node as well as software resources associated with child nodes of the given node can be used by the client computer. A software resource manager can be configured to prevent installation, execution, use, etc., of software resources for nodes above the respective parent node that do not have a corresponding valid license.

Figure 1:
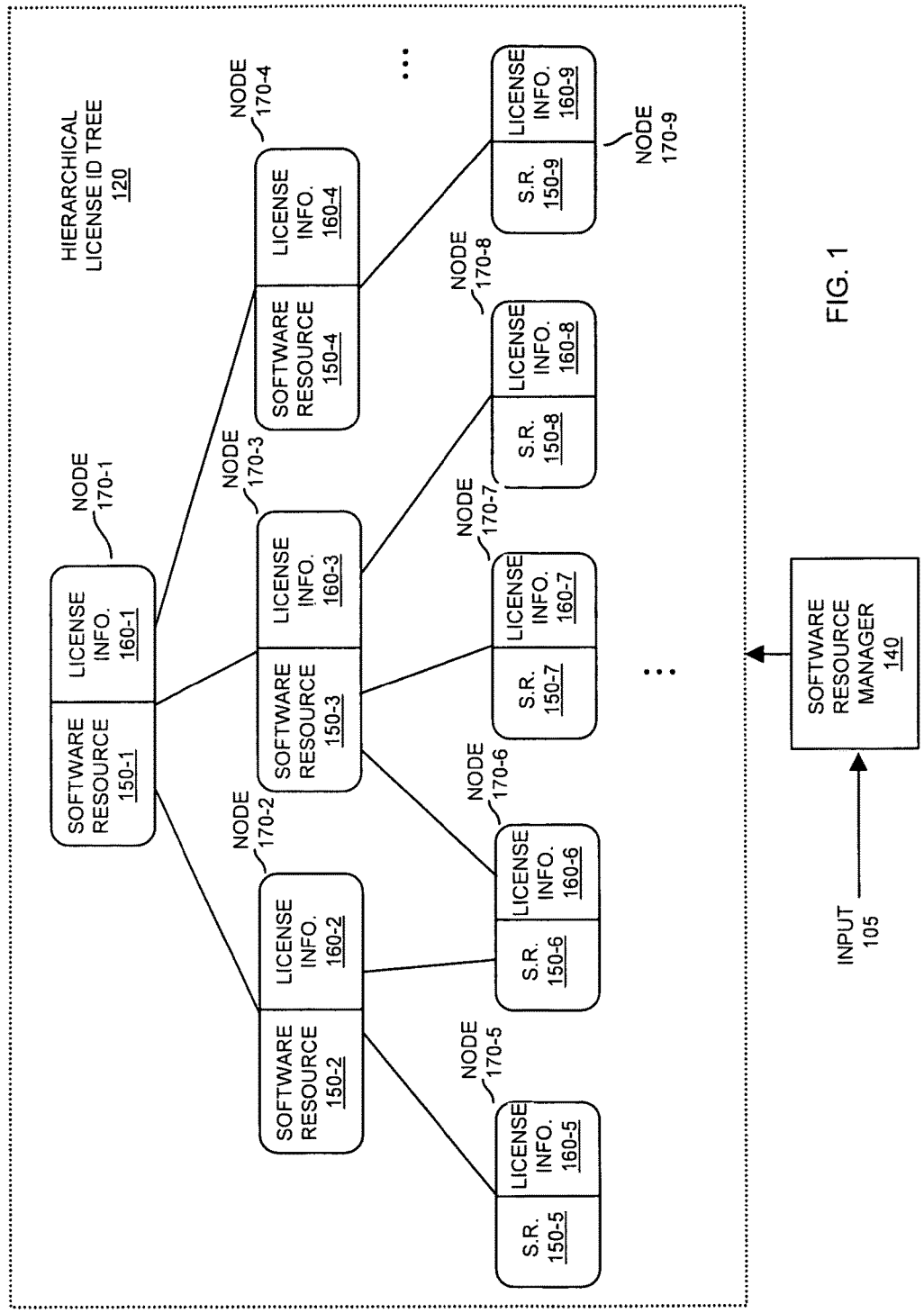
FIG. 1 is an example diagram of a hierarchical license tree and related functionality according to embodiments herein.

FIG. 1 is an example diagram of a hierarchical license tree such as license ID tree 120 according to embodiments herein. As shown, hierarchical license ID tree 120 includes multiple nodes 170 such as node 170-1, node 170-2, node 170-3, node 170-4, node 170-5, node 170-6, node 170-7, node 170-8, node 170-9, etc.

Each of nodes 170 in hierarchical license ID tree 120 can represent a corresponding software resource. For example, node 170-1 represents software resource 150-1, node 170-2 represents software resource 150-2, node 170-3 represents software resource 150-3, node 170-4 represents software resource 150-4, node 170-5 represents software resource 150-5, node 170-6 represents software resource 150-6, node 170-7 represents software resource 150-7, node 170-8 represents software resource 150-8, node 170-9 represents software resource 150-9, etc.

By way of a non-limiting example, the software resources 150 can represent different types of protected content such as such as software applications executed by a processor, plug-ins used by the software applications, libraries of information, data structures, editor applications, programs, etc.

In one embodiment, the software resource manager 140 produces and/or maintains the hierarchical license ID tree 120 to include the multiple nodes 170 for tacking licensing information and corresponding resource information. For example, as mentioned above, the software resource manager 140 associates each of multiple software resources 150 to a node 170 in the hierarchical license ID tree 120. The software resource manager 120 stores license information 160 associated with the multiple nodes 170 in the hierarchical license ID tree 120 to specify whether a corresponding software resource at the node has an associated valid license for use by an entity.

In accordance with one embodiment, the license information 160 is a license code or serial number provided by an entity such as a user. The software resource manager 140 enters the license code or serial number into the node if the serial number or code is a valid for a corresponding license ID in the tree.

By way of a non-limiting example, the software resource manager 140 can maintain the hierarchical license ID tree 120 for any type of entity such as a user, a client computer system, group of users, group of computer systems, etc. Thus, the license information 170 can specify the different software resources 150 in which a corresponding entity has a valid license.

Note that the software resource manager 140 can maintain a different hierarchical license ID tree 120 for each of multiple entities that license software for use.

The hierarchical license ID tree 120 illustrates dominance of nodes 170 and software resources 150 with respect to each other. For example, as specified by the license information 160, if an entity has a valid license at a parent node in the hierarchical license ID tree 120, the entity is entitled to use the software resource corresponding to the parent node as well as software resources at corresponding child nodes beneath the parent node. Thus, parent nodes of the hierarchical license ID tree 120 dominate respective child nodes.

Node 170-1 is a root node of the hierarchical license ID tree 120. Node 170-1 is also a direct parent node with respect to nodes 170-2, 170-3, and 170-4. Nodes 170-2, 170-3, and 170-4 are therefore child nodes.

Each of nodes 170-2, 170-3, and 170-4 is also a parent node. For example, node 170-5 and node 170-6 are child nodes beneath parent node 170-2; node 170-6, node 170-7 and node 170-8 are child nodes beneath parent node 170-3; node 170-9 is a child node beneath parent node 170-4, and so on.

Thus, a node can be a child with respect to one node and a parent with respect to another node in the hierarchical license ID tree 120.

Embodiments herein therefore include maintaining or storing a valid license for a parent node in the hierarchical license ID tree 120 to indicate that a software resource associated with the parent node as well as software resources associated with nodes beneath the parent node are licensed for use by a corresponding entity.

As an example, assume that the software resource manager stores a valid license for node 170-2. In such an instance, the software resource manager 140 maintains node 170-2 to include license information 160-2 such as a valid license enabling the entity access, installation, use, etc., with respect to a first branch of software resources associated with and beneath node 170-2. The first branch of software resources includes software resource 150-2, software resource 150-5, and software resource 150-6.

Assume further that the software resource manager 140 also stores a valid license for node 170-3. In such an instance, the software resource manager 140 maintains node 170-3 to include license information 160-3 such as a valid license enabling access, installation, use, etc., with respect to a second branch of software resources associated with and beneath node 170-3. The second branch of software resources includes software resource 150-3, software resource 150-6, software resource 150-7, and software resource 150-8.

Branches of software resources thus can overlap with each other. For example, as discussed above, each of the branches such as the first branch and the second branch of software resources can include common node 170-6 associated with software resource 150-6. In comparison to conventional techniques, the hierarchical license ID tree 120 enables the software resource manager 140 to easily identify or keep track of which software resources the respective parent nodes 170-2 and 170-3 have in common.

The structure of the hierarchical license ID tree 120 is flexible, scalable, and simplifies keeping track of software resource licenses. For example, a single valid license for a given node in the hierarchical license tree enables the user to access, use, install, etc., the resource corresponding to the given node as well as software resources for child nodes of the parent. Thus, a valid license such as a key, code, serial number, etc., is not required for every node in the hierarchical license ID tree 120. Instead, the license information 170 can enable use of all or a portion of the software resources 150 in the hierarchical license ID tree 120 depending on which of one or more nodes 170 in the hierarchical license ID tree has a corresponding valid license.

Note that the software resource manager 140 can be configured to update the hierarchical license ID tree 120. For example, the software resource manager 140 can receive a valid license code for installing a respective software resource or grouping of software resources on a computer system. Subsequent to receiving the valid license, the software resource manager 140 can update the license information 170 with the valid license code to indicate that the entity has a license to use the respective software resource.

As a more specific example, assume that the hierarchical license tree represents different available, but yet-to-be purchased software resources from one or more vendors. As discussed above, the hierarchical license ID tree 120 can indicate a dependency of software resources as well as license dominance with respect to each other. The structure of the hierarchical license ID tree 120 can vary or change over time depending on usage and royalty agreements between vendors of the software resources 150.

Initially, the hierarchical license ID tree 120 may not include any valid licenses. At such time, an entity associated with the hierarchical license ID tree 120 cannot download or use any of the software resources. In response to receiving a valid license code for a software resource, the software resource manager 140 updates the license information 170 for a given node corresponding to the software resource being purchased. As mentioned above, the entity will thereafter be entitled to use the software resource for the given node having the valid license as well as any protected content such as software resources of child nodes beneath the given node.

Note that the hierarchical license tree need not reflect software resources that are currently installed on a respective computer. For example, software resources can be installed a respective computer system in response to detecting presence of valid license information in the respective hierarchical license ID tree 120. However, the software resource manager 120 can store the license information 170 to indicate the valid license code exists for the given node even though the first software resource has been de-installed from the computer system. Thus, a user need not resubmit the license code each time the user would like to install a respective software resource as the license and related information can be stored in the hierarchical license ID tree 120.

The software resource manager 140 can generate the hierarchical license ID tree 120 to include a parent node such as node 170-1 representing a suite of available software resources such as software resource 150-2, software resource 150-3, and software resource 150-4. In such an instance, the software resource manager 140 generates the hierarchical license ID tree 120 to include node 170-2, node 170-3, and node 170-4 beneath node 170-1. Thus, parent node 170-1 can represent a suite of software applications such as a first, second and third software application developed by a particular vendor.

Node 170-2 can represents the first software application in the suite. Node 170-3 can represent the second software resource in the suite. Node 170-4 can represent the third software resource in the suite.

Nodes beneath nodes 170-2, 170-3, and 170-4 can represent protected software content such as plug-ins developed by third party vendors. The plug-ins can enable functionality that enhances use of the first, second and third software applications. Accordingly, when an entity purchases a license for the software suite of applications, the entity may be entitled to install and use each of the vendor's software application as well as third-party protected software content such as plug-ins.

As mentioned above, the software resource manager 140 can be configured to allow access or use of corresponding software resources 150 depending on whether the hierarchical license tree includes valid license for requested software. For example, in one embodiment, the software resource manager 140 can receive a request to access a software resource corresponding to a child node in the tree. In response to receiving the request such as input 105, the software resource manager 140 can identify a location of the child node in the hierarchical license tree corresponding to the software resource. To determine whether a requesting entity is authorized to use the software resource, the software resource manager traverses up from the child node (associated with the requested resource) in the hierarchical license ID tree 120 towards a root node 170-1 of the hierarchical license ID tree 120 to identify whether any parent nodes along relationship paths linking the child node towards the root node has a corresponding valid license. Responsive to detecting presence of the corresponding valid license, the software resource manager 140 provides access to the software resource.

Figure 2:
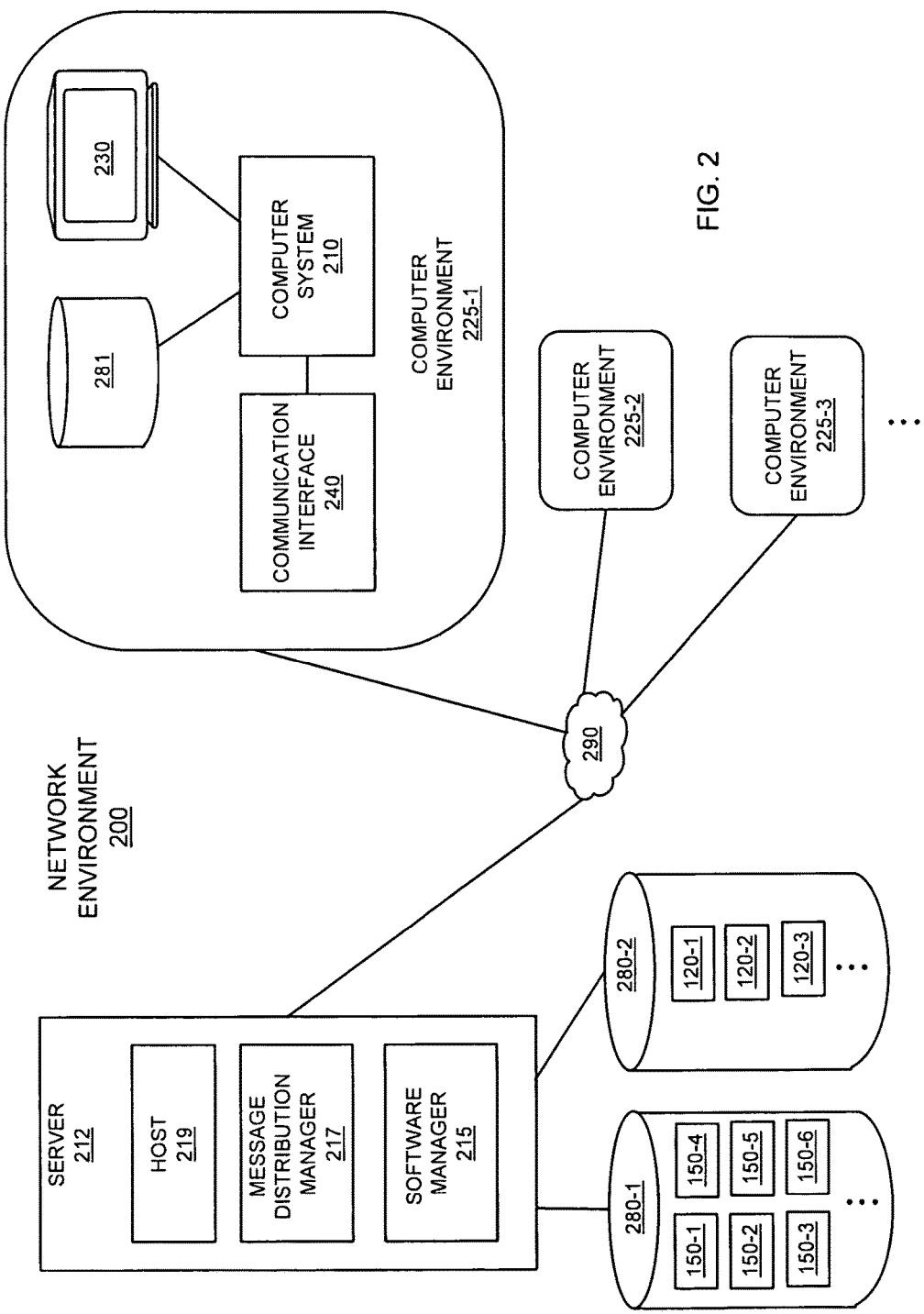
FIG. 2 is an example diagram of a network environment according to embodiments herein.

FIG. 2 is a diagram illustrating an example network environment 200 for enabling use of software resources and related services based at least in part on use of hierarchical license trees according to embodiments herein.

As shown, network environment 200 includes a server 210, repository 280-1, repository 280-2, network 290, and computer environments 225.

Server 212 is a logical representation of hardware in communication with computer environment 225-1, computer environment 225-2, computer environment 225-3, etc., over network 290. Server 212 can be configured to execute or host any software resources 150 stored in repository 280-1.

A respective computer environment such as computer environment 225-1 can include one or more computer systems in which users are able to execute software and/or make use of software services provided by server 212 over network 290. As shown, computer environment 225-1 can include different resources such as a communication interface 240, computer system 210, repository 281, display screen 230, etc. to enable an entity such as a user to carry out tasks using software resources 150. However, as mentioned above, any portion of the software resources 150 can be executed at server and/or computer system 210.

Repository 280-1 stores software resources 150.

Repository 280-2 stores hierarchical license tree 120-1 associated with computer environment 225-1, a hierarchical license tree 120-2 associated with computer environment 225-2, a hierarchical license tree 225-3 associated with computer environment 225-3, and so on. As previously discussed, each hierarchical license tree specifies which software resources have been licensed for use by an entity. Thus, hierarchical license tree 120-1 specifies the different software resources licensed for use by one or more computers in computer environment 225-1; hierarchical license tree 120-2 specifies the different software resources licensed for use by one or more computers in computer environment 225-2; hierarchical license tree 120-3 specifies the different software resources licensed for use by one or more computers in computer environment 225-3; and so on.

In one embodiment, network environment 200 is a SaaS type environment in which software is available as a service to each of multiple computer environments 225 that have an appropriate license to use such software services. In such an embodiment, a software application and/or related software resources can be executed by host 219 or other third-party host platform to provide customers software services over network 290.

By way of a non-limiting example, network 290 can be the Internet or other type of network supporting client-server communications.

The software as a service type of software deployment can be implemented to eliminate a need to install and run a respective software application on the customer's own computer(s) as at least a portion of the enabled applications are executed at host 219 at the server 212 or other service provider that acts as the host. Such an embodiment alleviates the customer's burden of software maintenance, ongoing operation, support, etc., of purchased software services.

To facilitate deployment of software services, the server 212 includes software manager 215 and message distribution manager 217.

As its name suggests, the software manager 215 manages distribution and execution of software resources at host 219 to provide services over network 290 for use at one or more different computer environments 225.

As an example, the server 212 can provide client computer system 210 access to a software manager 215 over network 290. To use software services, the computer system 210 sends a message to server 212 requesting use of one or more software resources.

In response to receiving the message from the client computer in computer environment 225-1, the software manager 215 traverses a respective hierarchical license tree 120-1 associated with the client computer system 210 to identify which, if any, software resources have been licensed for use by the client computer system 210. For example, the software manager 215 can be configured to identify a node in the hierarchical license tree 120-1 corresponding to a software resource capable of providing a respective software service being requested. The software manager 215 traverses the hierarchical license tree 120-1 to identify whether the client computer system 210 has a valid license to use the service. If so, in a manner as discussed above, the software manager 215 enables the client computer system 210 to use a group of software resources including the software resource associated with the parent node in which the client had a valid license and any software resources associated with child nodes beneath the parent node. In this way, the hierarchical license tree 120-1 can be used to enable distribution and use of software services over network 290.

In further embodiments, after making a determination of which software resources a client is entitled to use, the software manager 215 can initiate execution of the grouping of software resources at a host computer 219 that executes the software resources. The host computer executing the group of resources can reside at server 212 or some other location in network environment 200. As mentioned above, the host 219 provides software services over the network to the client computer. Thus, the software resources licensed for use by the client computer system 210 need not actually execute the software resources. Instead, the software resources, or portions thereof, can be executed at a remote location such as host 219 that, in turn, provides the services over network 290 to the computer environment 225-1.

As its name suggests, the message distribution manager 217 can be configured to generate messages for software resources represented by nodes in the hierarchical license tree. Note that the messages can be transmitted over network 290 to client computer systems that are licensed to use the respective software resource or receive such services. Accordingly, the clients can be apprised of information such as tutorials, updates, feature alerts, etc. associated with the software services in which the entity is licensed to use.

In one embodiment, the hierarchical license tree keeps track of a type of license granted to each respective client. By way of a non-limiting example, clients can be licensed to use different versions of software such as a trial version in which a client has limited capabilities. Clients also can be granted a full use license in which the client is able to use all software features. Yet other non-trial licenses can enable a respective client to use only certain features in a software application. Other types of licenses may allow use of different versions of the software.

Message distribution manager 217 can be configured to filter which of the messages from server 212 are sent to the client computer system depending on whether the client computer has a respective license to use a corresponding software resource in the hierarchical license tree. Thus, the client will not be inundated with messages associated with software resources in which the client is not licensed to use.

The message distribution manager 217 also can be configured to filter messages based on a type associated with the valid software license issued to the client. For example, the message distribution manager 217 can enable transmission of a first type of messages to the client computer when the valid software license is of a first type such as a trial license. The message distribution manager 217 can enable transmission of a second type of messages to the client computer when the valid software license is of a second type such as a full use license, and so on.

In the manner as discussed above for computer environment 225-1, the server 212 can be configured to provide software services to other computer environments over network 290 depending on which software resources have been licensed for by the computer environments.

Figure 3:
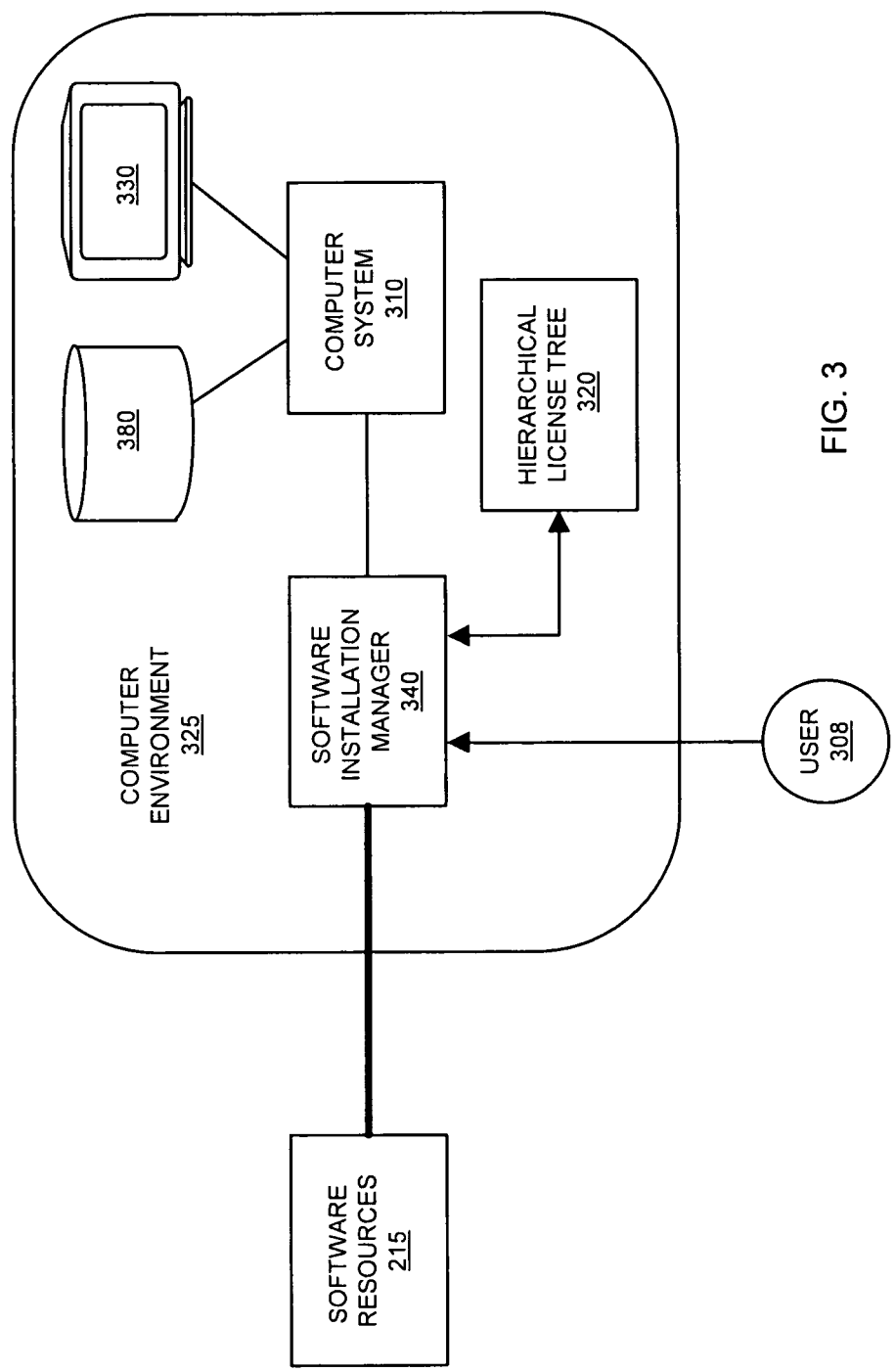
FIG. 3 is an example diagram of a computer environment according to embodiments herein.

FIG. 3 is an example diagram illustrating a technique for distribution of software resources according to embodiments herein.

As shown, computer environment 325 includes a software installation manager 340, computer system 310, hierarchical license tree 320, repository 380, and a display screen 330.

In general, user 308 can initiate installation of software resources for execution by computer system 310. In comparison to the example embodiment as discussed above in FIG. 2, the computer system 310 in FIG. 3 can be configured to install and execute software resources locally depending on whether the user 310 has been granted a license as identified by hierarchical license tree 320.

Software resources 215 can be located at a remote location over a network, stored on a removable disk, etc.

In general, the software installation manager 340 has access to software resources 250 and enables installation and/or use of the software resources 150 depending on the presence of one or more licenses in the hierarchical license tree 320.

In response to receiving input from a user 308, the software installation manager 340 initiates downloading of one or more of software 215 to into repository 380 for subsequent execution by computer system 310. As discussed above, installation of software resources 215 depends on whether a respective user 308 has a corresponding license.

More specifically, the hierarchical license tree 320 includes license information indicating which software resources user 308 has a corresponding license.

Based on detecting that a valid software license exists for a respective parent node of the hierarchical license tree 320, the software installation manager 340 enables installation of software resources associated with the parent node as well as software resources associated with nodes beneath the respective parent node. The software installation manager 340 prevents installation of software resources for nodes above the respective parent node.

Figure 4:
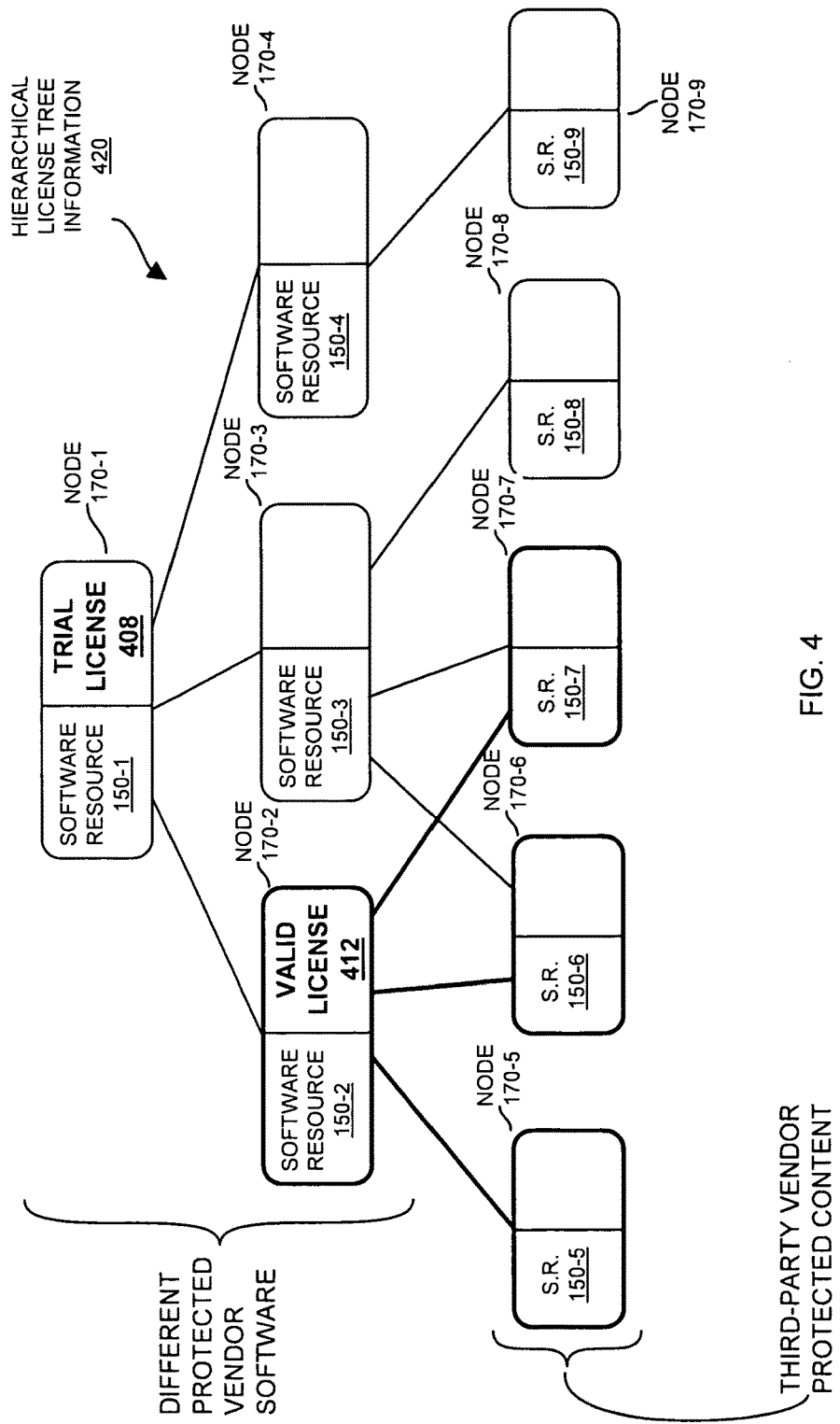
FIG. 4 is an example diagram of a hierarchical license tree populated with license information according to embodiments herein.

FIG. 4 is an example diagram illustrating a hierarchical license tree 420 according to embodiments herein.

As shown, the software resources at the root node 170-1 as well as at a level beneath the root node 170-1 such as software resources 150-2, 150-3, and 150-4 can represent software produced by a given vendor. As previously discussed, the hierarchical license tree 420 can include software resources from multiple vendors as well.

In one embodiment, note that the hierarchical license tree 420 can be configured to include additional information such as vendor identifiers indicating a vendor that develops or owns the corresponding software resource at the node in the tree. In accordance with embodiments as discussed above, the hierarchical license tree 420 can be maintained to store first license information indicating whether a software resource developed by a first vendor has been licensed for use by an entity; the hierarchical license tree 420 also can be maintained to store second license information indicating whether a software resource developed by a second vendor has been licensed for use by the entity; and so on.

When a license such as software resource 150-2 is purchased for use, the given vendor grants valid license 412 enabling installation and use of software resource 150-2 as well as third-party protected content such as software resources 150-5, 105-6 and 150-7. The third-party vendors may receive royalties as a result of the purchase.

A given vendor may wish to promote sales of their other software to entice a respective entity to purchase additional software produced by the given vendor. For example, the given vendor can grant a trial license 408 to the entity for use of software resource 150-1 in the trial mode.

In such an instance, the given vendor may not have the authority to enable use of software resource 150-8, software resource 150-9, etc., because the entity did not purchase a full-use license. However, because the entity does have a valid license 412 for using software resource 150-2 and software beneath node 170-2, the given vendor can allow installation and/or use of software resource 150-6 and software resource 150-7 in connection with the trial software because the entity does have a valid license for software resource 150-2.

In one embodiment, granting of the trial license 408 for a node in the hierarchical license tree 420 can be contingent upon whether a valid license exists at another node in the hierarchical license tree 420. For example, a software resource manager can receive a request to install trial software on a computer system. The software resource manager can be configured to identify whether the hierarchical license tree includes a node corresponding to the requested trial software. If so, and in response to detecting a valid license 412 associated with a child node such as node 170-2 beneath the parent node such as node 170-1, the software resource manager can enable installation and use of software resource 150-1 in the trial mode.

Thus, the hierarchical license tree 420 can be used to enable a trial mode for a suite of software products as long as an entity has purchased a valid license for at least one of the software resources in the the suite. In such an embodiment, node 170-1 represents the suite of software products. Each of nodes 170-2, 170-3, and 170-4 represent individual software products in the suite.

Note that when the trial license has been granted for use, the software resource manager can be configured to update node 170-1 of the hierarchical license tree 420 to reflect that the entity has a trial license for software resource 150-1.

Thus, embodiments herein can include receiving a request to install trial software on a computer system. In response to identifying that the license information includes a valid license for software developed by a same vendor as the trial software, enabling installation and/or use of the trial software. In accordance with such an embodiment, the hierarchical license tree 420 can be used to identify whether a trial license will be granted. That is, granting of a trial license for vendor software can be contingent upon whether the entity has a valid license for any qualifying software produced by the vendor.

As mentioned above, branches of software resource nodes in the hierarchical license tree can at least partially overlap with each other in cases where a software resource is enabled for use by two different parent software resources.

As an example, a software resource manager can store a valid license for parent node 170-2 in the hierarchical license tree 420. The branch of nodes including the parent as well as software resource nodes beneath the parent node represents software resources enabled for use by a computer system.

To encourage sales of other software, a vendor may enable use of a trial version of another software resource as represented by a second parent node in the tree such as node 170-1. The branches of nodes beneath node 170-1 represent software resources temporarily enabled in the trial mode for use by a computer system. As mentioned above, the trial mode may not allow use of every software resource node beneath node 170-1 as would a valid full-use license code. However, software resource nodes such as node 150-6 and node 150-7 happen to be in the branch of nodes beneath node 170-2 and therefore can be used by the trial software. Thus, the given software resource associated with node 170-1 can be used by the trial software in circumstances when a valid license, associated with software other than the trial software, enables use of the given software resource.

Embodiments herein can include traversing from child nodes in the hierarchical license tree towards a root node of the hierarchical license tree to identify whether any parent nodes along relationship paths linking the child node towards the root node has a corresponding valid license. Responsive to detecting presence of the corresponding valid license in path to the root, a software resource manager provides access to the software resource.

Another way to identify which third-party protected content can be used in the trial mode is to traverse the hierarchical license tree 420 to identify overlapping software resources. For example the software resource manager can identify a parent node such as node 170-1 in the hierarchical license tree 420 corresponding to trial software. The software resource manager identifies one or more child nodes beneath parent node 170-1. In one embodiment, the child nodes and their children represent software resources for use by the entity as long as the software vendor granting the trial license owns the software resources at the child nodes.

In accordance with another embodiment, to identify overlapping software resources, the software resource manager can identify a parent node such as node 170-1 in the hierarchical license tree corresponding to trial software resource. The software resource manager then traverse paths toward leaf nodes of the tree to identify a group of multiple child nodes beneath the trial software node.

As an example, the group of multiple child nodes such as nodes 170-5, 170-6, 170-7, 170-8, and 170-9 represent software resources for potential use by the trial software. Such resources can be used by an entity as long as such resources overlap with a software grouping having a valid license 170-2. For example, for each respective child node representing protected third-party vendor content, the software resource manager traverses paths from the respective child nodes in the hierarchical license tree 420 towards a root node 170-1 of the hierarchical license tree 420 to identify whether any parent nodes of the child nodes, other than the node 170-1, above the respective child node towards the root node has a valid license.

In the context of the present example, the software resource manager identifies that the software resource 150-2 at parent node 170-2 has a valid license and therefore indicates that software associated with nodes 170-5, 170-6, and 170-7 can be used by the trial software. Thus, the software resource manager providing access to software resources associated with each respective child node in the group having a respective valid license at a parent node in a relationship path from the respective child node to the root node.

The software resource manager can also implement a method of traversing downward from parent node in the tree to identify overlapping resources. For example, the software resource manager can identify all nodes beneath node 170-1 and enable use of software resources as long as the child nodes have a valid license in path at a respective parent node in the tree. Thus, software resources 150-5, 150-6, and 150-7 can be used by the trial software as represented by node 170-1.

Figure 5:
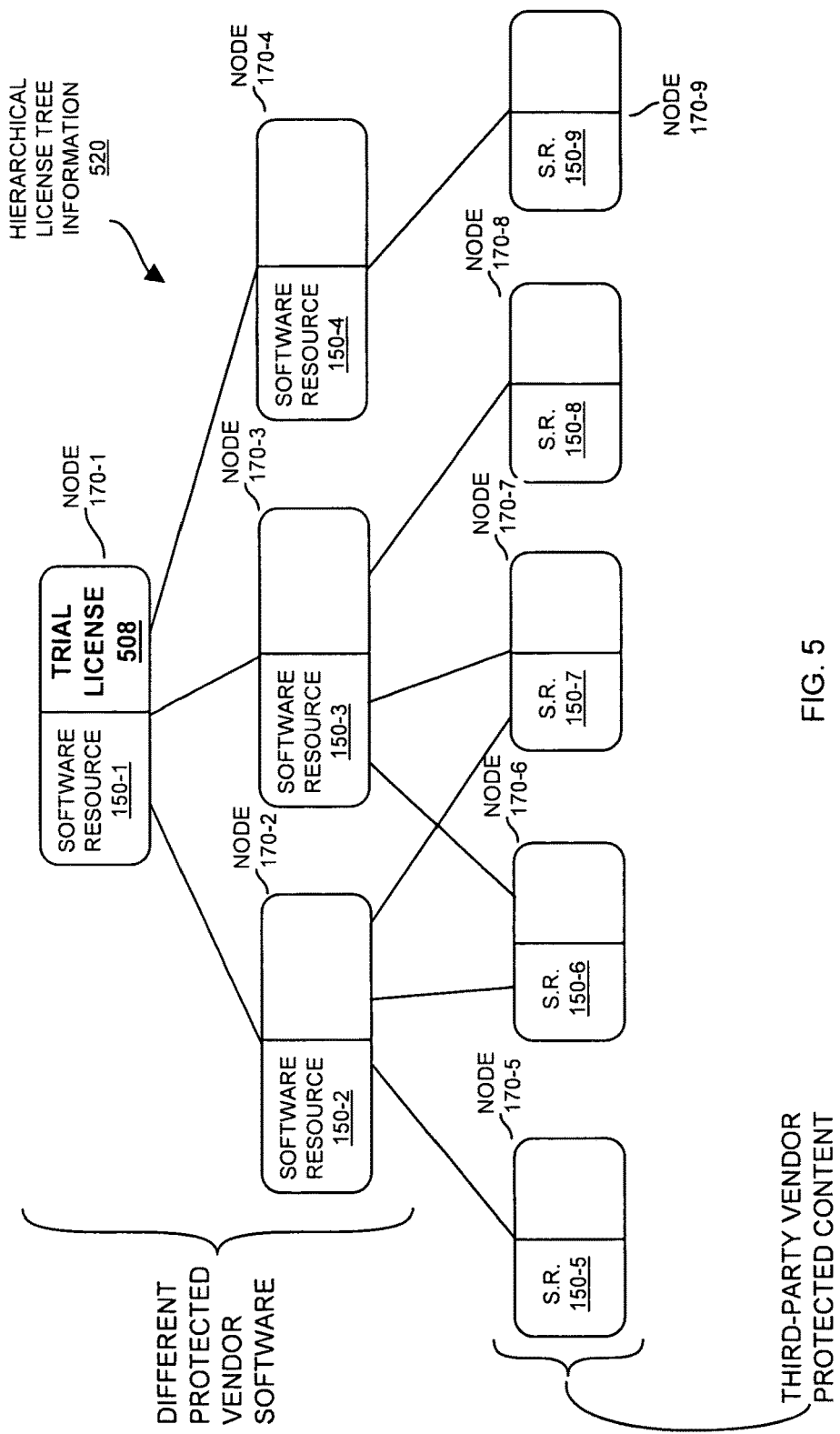
FIG. 5 is an example diagram of a hierarchical license tree populated with license information according to embodiments herein.

FIG. 5 is an example diagram illustrating a hierarchical license tree 520 according to embodiments herein. As shown, hierarchical license tree 520 includes only a trial license at node 170-1. Thus, the entity is entitled to use the software resource 150-1 as well as software resources 150-2, 150-3, and 150-4 in the trial mode. The software resource manager prevents use of software resource 150-5, 150-6, 150-7, 150-8, and 150-9 because such third-party vendors do not allow use of their software in a trial mode. The trial license may allow use of software resources 150-2, 150-3, and 150-4 because they are owned the same vendor that provides the trial license 508.

Figure 6:
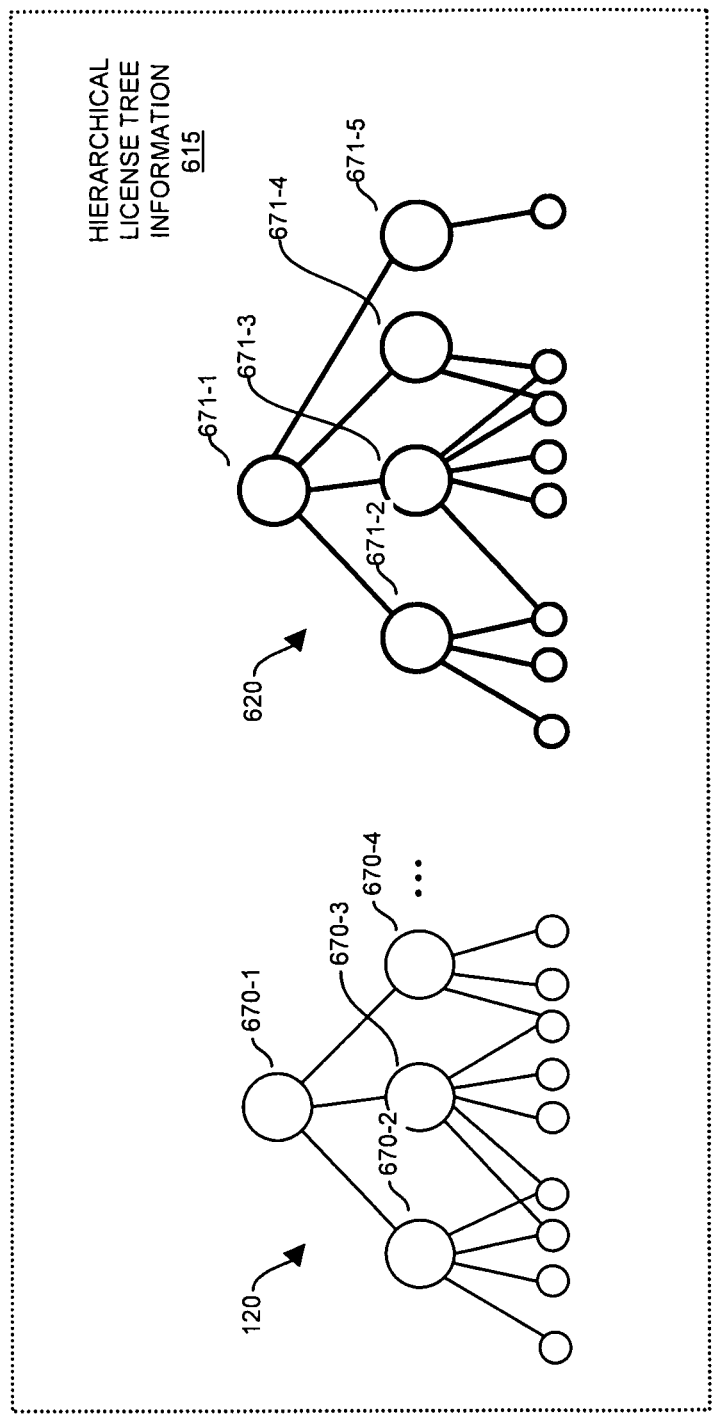
FIG. 6 is an example diagram of hierarchical license tree information according to embodiments herein.

FIG. 6 is an example diagram illustrating a way of managing hierarchical license tree information according to embodiments herein.

As shown, the hierarchical license tree information 615 can be configured to include multiple independent or related trees such as hierarchical license tree 120 and hierarchical license tree 620.

Initially, the hierarchical license tree information 615 can include the hierarchical license ID tree 120 as previously discussed.

A software developer may produce a new line of software that is not necessarily related to the original software as recited by hierarchical license ID tree 120. In such an instance, the hierarchical license tree information 615 can be updated to include hierarchical license tree 620, corresponding to the new line of software.

Thus, a structure of the hierarchical license tree information 615 can be updated over time based on a method such as a client computer polling a server to identify whether the software developer has any new software. If so, the structure of the tree such as nodes of the tree can be modified in accordance with the newly available software.

As an entity obtains valid licenses over time for new and old software as represented by nodes in hierarchical license ID tree 120 and hierarchical license tree 620, a tree manager updates the hierarchical license tree information 615 to indicate the valid licenses. The hierarchical license tree information can be used in a manner as previously discussed.

In one embodiment, the software resource manager can logically merge the hierarchical license ID tree 120 with hierarchical license tree 620 based on a relationship of one hierarchical license tree to another. In one embodiment, child nodes in hierarchical license ID tree 120 overlap with child nodes in hierarchical license tree 620.

The hierarchical license tree 120 and respective set of nodes can represent software resources associated with a first suite of available software resources. The hierarchical license tree 620 can represent a respective set of nodes representing software resources associated with a second suite of multiple software resources.

More specifically, node 670-1 can represent a first suite of software resources. The first suite can include a software resource associated with node 670-2, a software resource associated with node 670-3, and a software resource associated with node 670-4.

Node 671-1 can represent a second suite of software resources.

The second suite as represented by hierarchical license tree 620 can include a software resource associated with node 671-2, a software resource associated with node 671-3, a software resource associated with node 671-4, and a software resource associated with node 671-5.

Thus, hierarchical license ID tree 120 can represent a first suite of available of software resources. A software manager can update the hierarchical license tree information 615 to include hierarchical license tree 620 to represent a second suite of available software resources.

Figure 7:
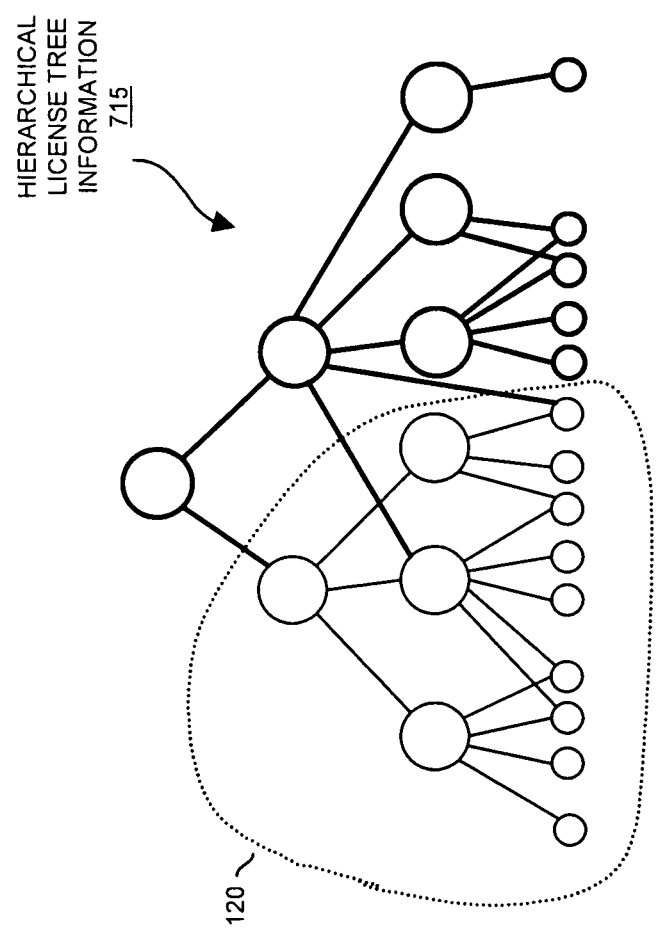
FIG. 7 is an example diagram of hierarchical license tree information according to embodiments herein.

FIG. 7 is an example diagram illustrating updating of hierarchical license tree information 715 according to embodiments herein. In comparison to the hierarchical license tree information 615 of FIG. 6, the hierarchical license tree information 715 in FIG. 7 illustrates that an original hierarchical tree such as hierarchical license ID tree 120 can be updated to include nodes representing new software resources.

In a similar manner as discussed above, a structure of the hierarchical license ID tree 120 can be modified over time based on input from one or more resources over a network.

Figure 8:
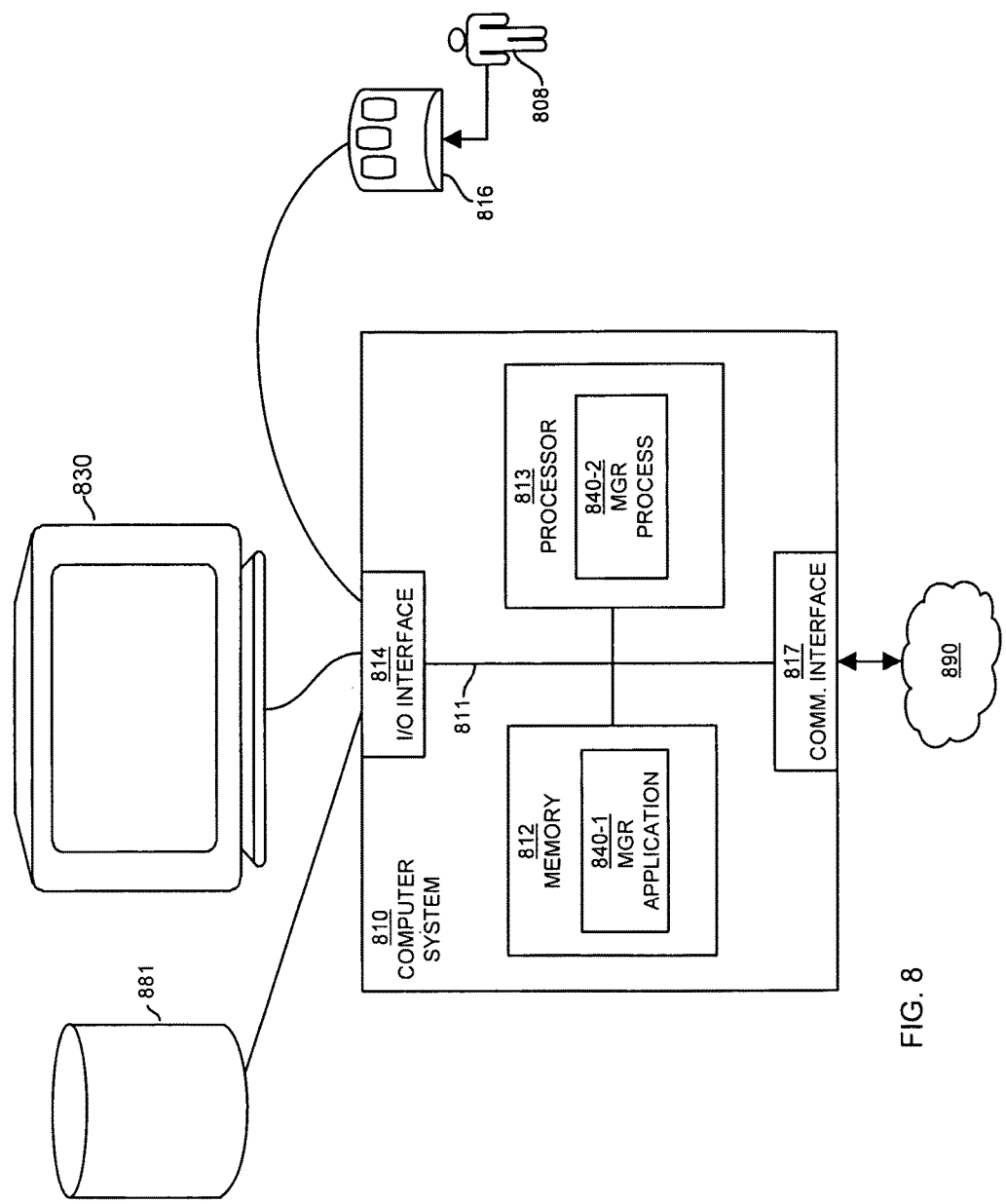
FIG. 8 is a diagram illustrating an example computer architecture for carrying out functionality according to embodiments herein.

FIG. 8 is a block diagram of an example architecture of a respective computer system 810 for implementing any of the manager and/or related functions according to embodiments herein.

Computer system 810 can be a computerized device such as a personal computer, workstation, portable computing device, console, network terminal, processing device, network device, etc.

Note that the following discussion provides a basic embodiment indicating how to carry out functionality associated with a manager function. It should be noted that the actual configuration for carrying out the operations as described herein can vary depending on a respective application.

As shown, computer system 810 of the present example includes an interconnect 811 that couples a memory system 812, a processor 813, I/O interface 814, and a communications interface 817. I/O interface 814 provides connectivity to peripheral devices 816, if such devices are present, such as a keyboard, mouse, display screen 830, etc.

User 808 can provide input to computer system 810. Communications interface 817 enables computer system 810 and, more particularly, manager 840 to communicate over network 890 to retrieve information from remote sources. I/O interface 814 enables the manager 140 to retrieve locally stored information from repository 881.

As shown, memory system 812 can be encoded with manager application 840-1 that supports functions as discussed above and as discussed further below. The manager application 840-1 can be embodied as software code such as data and/or logic instructions. When executed, the code stored on a computer storage medium can support processing functionality according to different embodiments described herein.

During operation of one embodiment, processor 813 accesses memory system 812 via the use of interconnect 811 in order to launch, run, execute, interpret or otherwise perform the logic instructions of the manager application 840-1. Execution of the manager application 840-1 produces processing functionality in manager process 840-2. In other words, the manager process 840-2 represents one or more portions of the manager application 840-1 performing within or upon the processor 813 in the computer system 810.

It should be noted that, in addition to the manager process 840-2 that carries out method operations as discussed herein, other embodiments herein include the manager application 840-1 itself such as the un-executed or non-performing logic instructions and/or data. As mentioned, the manager application 840-1 may be stored on a computer storage medium (e.g., a repository) such as a floppy disk, hard disk or in an optical medium. According to other embodiments, the manager application 840-1 can also be stored in a memory type system such as in firmware, read only memory (ROM), or, as in this example, as executable code within the memory system 812 (e.g., within Random Access Memory or RAM).

In addition to these embodiments, it should also be noted that other embodiments herein include the execution of the functionality as described herein via processor 513. Thus, those skilled in the art will understand that the computer system 810 can include other processes and/or software and hardware components, such as an operating system that controls allocation and use of hardware resources.

Functionality supported by computer system 810 and, more particularly, functionality associated with embodiments herein will now be discussed via flowcharts in FIGS. 9-10. Note that there will be some overlap with respect to concepts discussed above for FIGS. 1 through 7. Also, note that the steps in the below flowcharts need not always be executed in the order shown.

Figure 9:
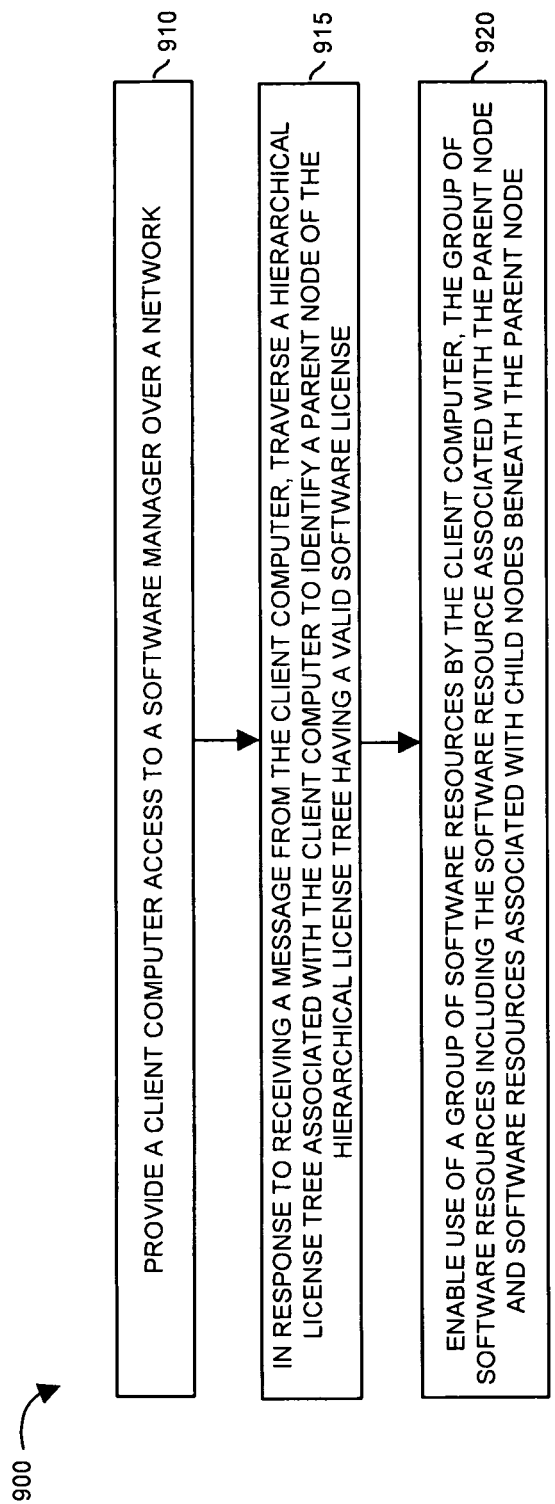
FIG. 9 is a flowchart illustrating an example method in which software services are made available over a network using a hierarchical license tree according to embodiments herein.

FIG. 9 is a flowchart 900 illustrating a technique of providing software services based on use of a hierarchical license tree according to embodiments herein.

In step 910, the server 212 provides a client computer access to a software manager 215 over network 290.

In step 915, in response to receiving a message from the client computer 210, the software manager 215 of server 212 traverses a hierarchical license tree 120-1 associated with the client computer 210 to identify a parent node of the hierarchical license tree having a valid software license.

In step 920, software manager 215 of server 212 enables use of a group of software resources by the client computer 210. The group of software resources can include the software resource associated with the parent node and software resources associated with child nodes beneath the parent node. Access can provided to the software resources at the child nodes even though the nodes themselves do not have a corresponding valid license.

Figure 10:
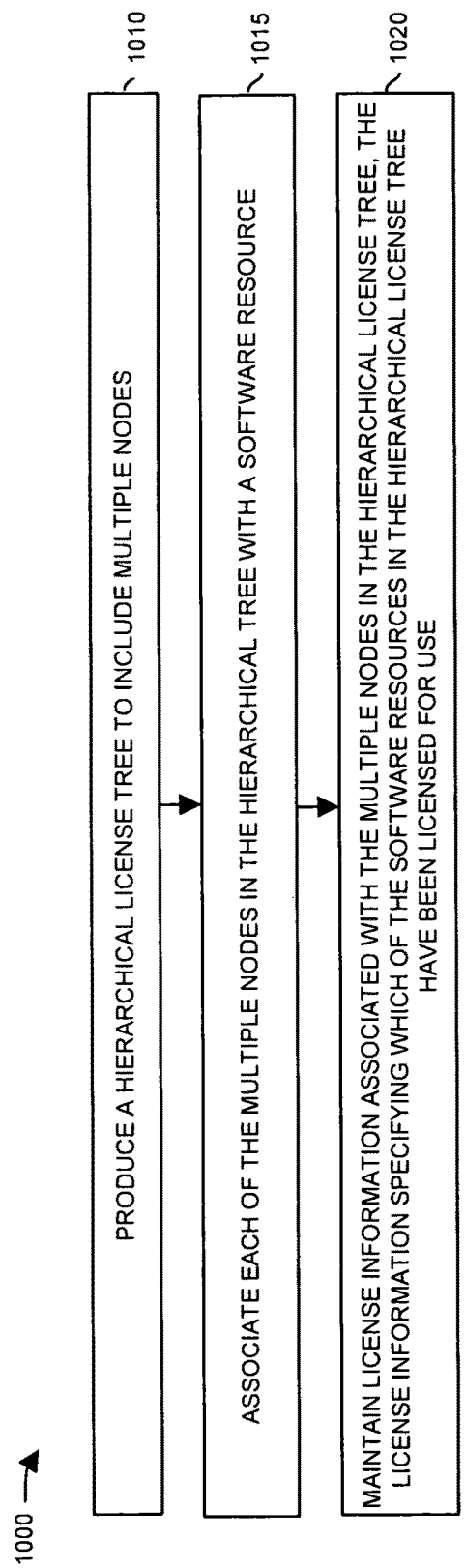
FIG. 10 is a flowchart illustrating an example of a method of maintaining a hierarchical license tree and related information according to embodiments herein.

FIG. 10 is a flowchart 1000 illustrating a technique of keeping track of licenses using a hierarchical license tree according to embodiments herein.

In step 1010, the software resource manager 140 produces a hierarchical license ID tree 120 to include multiple nodes 170.

In step 1015, the software resource manager 140 associates each of the multiple nodes in the hierarchical tree 120 with a corresponding software resource 150.

In step 1020, the software resource manager 140 stores license information 160 associated with the multiple nodes 170 in the hierarchical license ID tree 120. The license information 160 specifies which of the software resources 150 in the hierarchical license ID tree 120 have been licensed for use by a respective entity.

Note again that techniques herein are well suited for management of software resources using a hierarchical license tree as described herein. However, it should be noted that embodiments herein are not limited to use in such applications and that the techniques discussed herein are well suited for other applications as well.

Below is sample language for the beginning of a specification to provide arguments that claimed subject matter is a physical process or element:

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer-implemented method comprising:
   receiving, by a processor of a software management server, license information;
   identifying, by the processor, a particular node in a software resource hierarchical license tree based at least in part on the received license information, the software resource hierarchical license tree comprising a plurality of nodes, each of the plurality of nodes corresponding to a respective software resource;

storing, by the processor, a software resource license corresponding to the particular node, the software resource license indicating that a particular software resource corresponding to the particular node and first software resources corresponding, respectively, to lower nodes beneath the particular node in the software resource hierarchical license tree are licensed for use;

receiving, by the processor and from a client device, a request to access the particular software resource;

traversing, by the processor, the software resource hierarchical license tree and thereby locating the particular node corresponding to the particular software resource identified in the request; and based on locating the particular node corresponding to the particular software resource:

enabling installation of the particular software resource and the first software resources respectively corresponding to the lower nodes beneath the particular node in the software resource hierarchical license tree, and preventing installation of second software resources corresponding to one or more upper nodes above the particular node in the software resource hierarchical license tree.

2. The computer-implemented method of claim 1 further comprising the processor performing one or more operations comprising:

traversing at least a portion of the plurality of nodes in the software resource hierarchical license tree to identify additional software resources authorized to be installed on one or more computer systems.

3. The computer-implemented method of claim 1 further comprising the processor performing one or more operations comprising:

storing an additional software resource license corresponding to an additional node in the software resource hierarchical license tree, the additional software resource license indicating that an additional software resource corresponding to the additional node and software resources respectively corresponding to additional lower nodes beneath the additional node in the software resource hierarchical license tree are licensed for use, wherein the additional node is not in a subset comprising the particular node and the lower nodes beneath the particular node in the software resource hierarchical license tree.

4. The computer-implemented method of claim 1 further comprising the processor performing one or more operations comprising:

identifying an additional node in the software resource hierarchical license tree based at least in part on the received license information, the additional node different than the particular node, the additional node corresponding to a valid license associated with the received license information, wherein an additional software resource corresponding to the additional node and the particular software resource corresponding to the particular node are both developed by a same vendor; and wherein the software resource license corresponding to the particular node comprises a trial license.

5. The computer-implemented method of claim 1 further comprising the processor performing one or more operations comprising:

identifying an additional node in the software resource hierarchical license tree based at least in part on the received license information, the additional node being beneath the particular node in the software resource hierarchical license tree, the additional node corresponding to a valid license associated with the received license information; and wherein the software resource license corresponding to the particular node comprises a trial license.

6. The computer-implemented method of claim 1, further comprising:

generating the software resource hierarchical license tree based at least in part on a plurality of software resources, a first subset of the plurality of software resources being dependent upon a second subset of the plurality of software resources.

7. The computer-implemented method of claim 1 further comprising the processor performing one or more operations comprising:

generating at least a portion of the software resource hierarchical license tree by logically merging a first software resource hierarchical license tree and a second software resource hierarchical license tree, wherein the first software resource hierarchical license tree comprises a first plurality of nodes, the first plurality of nodes corresponding to a first plurality of software resources associated with a first suite, and wherein the second software resource hierarchical license tree comprises a second plurality of nodes, the second plurality of nodes corresponding to a second plurality of software resources associated with a second suite.

8. The computer-implemented method of claim 7, wherein at least one software resource in the first plurality of software resources and at least one software resource in the second plurality of software resources is a same software resource.

9. The computer-implemented method of claim 1, further comprising the processor performing one or more operations comprising:

generating at least a portion of the software resource hierarchical license tree, wherein generating the at least the portion of the software resource hierarchical license tree comprises:

including a first additional node in the software resource hierarchical license tree, the first additional node representing a first additional plurality of software resources in a suite of software resources; and including a second additional node beneath the first additional node in the software resource hierarchical license tree, the second additional node representing at least a subset of the first additional plurality of software resources; and including a third additional node beneath the first additional node in the software resource hierarchical license tree, the third additional node representing at least a different subset of the first additional plurality of software resources.

10. The computer-implemented method of claim 1 further comprising the processor performing one or more operations comprising:

receiving an additional request to access an additional software resource;

identifying an additional node in the software resource hierarchical license tree, the additional node corresponding to the additional software resource;

traversing the software resource hierarchical license tree from the additional node towards a root node of the software resource hierarchical license tree; and for a traversed node:
   determining that the traversed node corresponds to a valid license; and
   in response to determining that the traversed node corresponds to the valid license, providing access to the additional software resource.

11. The computer-implemented method of claim 1, wherein the software resource license indicates whether at least one software resource developed by a first vendor has been licensed for use by an entity.

12. The computer-implemented method of claim 1, further comprising the processor performing one or more operations comprising:
   identifying, in the software resource hierarchical license tree, an additional node corresponding to trial software;
   identifying a subset of the plurality of nodes beneath the additional node, each identified node in the subset corresponding to a respective software resource for potential use by the trial software;
   for each identified node in the subset, traversing the software resource hierarchical license tree from the identified node towards a root node of the software resource hierarchical license tree and thereby identifying a parent node, other than the additional node, that corresponds to a valid license; and
   providing access to a respective software resource associated with each node in the subset having the valid license from the parent node based on the parent node being in a relationship path from the node in the subset to the root node.

13. The computer-implemented method of claim 1 further comprising the processor performing one or more operations comprising:
   generating a plurality of messages, each message associated with at least one software resource;
   identifying licensed software resources that have been licensed for use by a corresponding client system based at least in part on information in the software resource hierarchal license tree and the received license information; and
   filtering the plurality of messages based on the licensed software resources that have been identified as licensed for use by the corresponding client system.

14. The computer-implemented method of claim 1 further comprising:
   utilizing the software resource hierarchical license tree to keep track of software resources licensed for use by a client system.

15. The computer-implemented method of claim 1, wherein only the software resource license corresponding to the particular node is stored in response to the received license information.

16. The computer-implemented method of claim 1, wherein the software resource license corresponds to only the particular node in the software resource hierarchical license tree.

17. The computer-implemented method of claim 1, wherein the software resource license corresponding to the particular node allows at least one of the group consisting of access to, installation of, and execution of the particular software resource corresponding to the particular node and the first software resources respectively corresponding to the lower nodes beneath the particular node in the software resource hierarchical license tree.

18. The computer-implemented method of claim 1, wherein the particular software resource comprises one or more of an executable application or a plug-in for an application.

19. A non-transitory computer-readable medium on which is encoded program code that is executable by one or more processing devices, wherein the program code, when executed by the one or more processing devices, causes the one or more processing devices to:
   receive license information;
   identify a particular node in a software resource hierarchical license tree based at least in part on the received license information, the software resource hierarchical license tree comprising a plurality of nodes, each of the plurality of nodes corresponding to a respective software resource;
   store a software resource license corresponding to the particular node, the software resource license indicating that a particular software resource corresponding to the particular node and first software resources corresponding, respectively, to lower nodes beneath the particular node in the software resource hierarchical license tree are licensed for use;
   receive, from a client device, a request to access the particular software resource;
   traverse the software resource hierarchical license tree and thereby locating the particular node corresponding to the particular software resource identified in the request; and
   based on locating the particular node corresponding to the particular software resource, perform operations comprising:
      enabling installation of the particular software resource and the first software resources respectively corresponding to the lower nodes beneath the particular node in the software resource hierarchical license tree, and
      preventing installation of second software resources corresponding to one or more upper nodes above the particular node in the software resource hierarchical license tree.

20. The non-transitory computer-readable medium of claim 19, wherein the program code, when executed by the one or more processing devices, also causes the one or more processing devices to perform operations comprising:
   receiving an additional request to access an additional software resource;
   identifying an additional node in the software resource hierarchical license tree, the additional node corresponding to the additional software resource;
   traversing the software resource hierarchical license tree from the additional node towards a root node of the software resource hierarchical license tree; and
   for a traversed node:
      determining that the traversed node corresponds to a valid license; and
      in response to determining that the traversed node corresponds to the valid license, providing access to the additional software resource.

21. The non-transitory computer-readable medium of claim 19, wherein the program code, when executed by the one or more processing devices, also causes the one or more processing devices to perform operations comprising:
   identifying, in the software resource hierarchical license tree, an additional node corresponding to trial software;
   identifying a subset of the plurality of nodes beneath the additional node, each identified node in the subset corresponding to a respective software resource for potential use by the trial software;

for each identified node in the subset, traversing the software resource hierarchical license tree from the identified node towards a root node of the software resource hierarchical license tree and thereby identifying a parent node, other than the additional node, that corresponds to a valid license; and providing access to a respective software resource associated with each node in the subset having the valid license from the parent node based on the parent node being in a relationship path from the node in the subset to the root node.

22. The non-transitory computer-readable medium of claim 19, wherein the particular software resource comprises one or more of an executable application or a plug-in for an application, wherein the software resource license corresponding to the particular node allows at least one of the group consisting of access to, installation of, and execution of the particular software resource corresponding to the particular node and the first software resources respectively corresponding to the lower nodes beneath the particular node in the software resource hierarchical license tree.

23. A system comprising:

a non-transitory computer-readable medium; and a processor connected with the non-transitory computer-readable medium, the processor configured to execute instructions stored on the non-transitory computer-readable medium and configured to:

receive license information;

identify a particular node in a software resource hierarchical license tree based at least in part on the received license information, the software resource hierarchical license tree comprising a plurality of nodes, each of the plurality of nodes corresponding to a respective software resource;

store a software resource license corresponding to the particular node, the software resource license indicating that a particular software resource corresponding to the particular node and first software resources corresponding, respectively, to lower nodes beneath the particular node in the software resource hierarchical license tree are licensed for use;

receive, from a client device, a request to access the particular software resource;

traverse the software resource hierarchical license tree and thereby locating the particular node corresponding to the particular software resource identified in the request; and based on locating the particular node corresponding to the particular software resource, perform operations comprising:

enabling installation of the particular software resource and the first software resources respectively corresponding to the lower nodes beneath the particular node in the software resource hierarchical license tree, and preventing installation of second software resources corresponding to one or more upper nodes above the particular node in the software resource hierarchical license tree.

24. The system of claim 23, wherein the processor is further configured to perform operations comprising:

receiving an additional request to access an additional software resource;

identifying an additional node in the software resource hierarchical license tree, the additional node corresponding to the additional software resource;

traversing the software resource hierarchical license tree from the additional node towards a root node of the software resource hierarchical license tree; and for a traversed node:

determining that the traversed node corresponds to a valid license; and in response to determining that the traversed node corresponds to the valid license, providing access to the additional software resource.

25. The system of claim 23, wherein the processor is further configured to perform operations comprising:

identifying, in the software resource hierarchical license tree, an additional node corresponding to trial software;

identifying a subset of the plurality of nodes beneath the additional node, each identified node in the subset corresponding to a respective software resource for potential use by the trial software;

for each identified node in the subset, traversing the software resource hierarchical license tree from the identified node towards a root node of the software resource hierarchical license tree and thereby identifying a parent node, other than the additional node, that corresponds to a valid license; and providing access to a respective software resource associated with each node in the subset having the valid license from the parent node based on the parent node being in a relationship path from the node in the subset to the root node.

26. The system of claim 23, wherein the particular software resource comprises one or more of an executable application or a plug-in for an application, wherein the software resource license corresponding to the particular node allows at least one of the group consisting of access to, installation of, and execution of the particular software resource corresponding to the particular node and the first software resources respectively corresponding to the lower nodes beneath the particular node in the software resource hierarchical license tree.

* * * * *